(12) United States Patent
Felvey, II

(10) Patent No.: US 12,134,683 B1
(45) Date of Patent: Nov. 5, 2024

(54) SYSTEMS AND METHODS FOR SEPARATING PLASTIC FROM FIBER

(71) Applicant: Jones Felvey, II, Kilmarnock, VA (US)

(72) Inventor: Jones Felvey, II, Kilmarnock, VA (US)

(73) Assignee: Jones Felvey, II, Kilmarnock, VA (US)

( * ) Notice: Subject to any disclaimer, the term of this patent is extended or adjusted under 35 U.S.C. 154(b) by 0 days.

(21) Appl. No.: 18/636,857

(22) Filed: Apr. 16, 2024

(51) Int. Cl.
*C08J 11/16* (2006.01)

(52) U.S. Cl.
CPC ............ *C08J 11/16* (2013.01); *C08J 2300/30* (2013.01)

(58) Field of Classification Search
USPC .......................................................... 521/40
See application file for complete search history.

(56) References Cited

FOREIGN PATENT DOCUMENTS

| JP | 2003055474 A | * | 2/2003 | |
| JP | 2007246833 A | * | 9/2007 | .............. C08J 11/04 |

OTHER PUBLICATIONS

JP-2003055474-A Machine Translation (Year: 2003).*
JP-2007246833-A Machine Translation (Year: 2007).*

* cited by examiner

*Primary Examiner* — Terressa Boykin
(74) *Attorney, Agent, or Firm* — Troutman Pepper Hamilton Sanders LLP; John A. Morrissett; Celeste K. Walker

(57) ABSTRACT

Disclosed embodiments may include a method of separating plastic from fiber. The method may include providing a solution including a chemical and water. The method may include combining the solution with fiber to generate a fiber/chemical solution. The method may include agitating the fiber/chemical solution to generate an agitated fiber/chemical solution. The method may include draining the agitated fiber/chemical solution through a sieve thereby separating one or more plastic particles from a remaining fiber/water mixture.

19 Claims, 2 Drawing Sheets

SYSTEMS AND METHODS FOR SEPARATING PLASTIC FROM FIBER

FIELD

The present application relates to systems and methods for separating plastic from fiber to facilitate re-use of the fiber portion in the manufacture of paper, and to decrease waste.

BACKGROUND

With the growing awareness of environmental and ecological protection, many corrugated cardboard boxes today include a mixture of virgin pulp (e.g., pine, birch) and recycled fibers. Traditional systems and methods for recycling the corrugated cardboard boxes involve mechanical-based devices and methods, which require high energy, cost, and time.

Despite the long felt need in the industry to solve this problem and decrease waste and related costs, prior systems were impractical and failed to adequately break the bond between plastic and fiber in the 3-4 percent waste to be useful at scale at paper manufacturing plants. Accordingly, there is a need for improved systems and methods for separating plastic from fiber to facilitate re-use of the fiber portion in the manufacture of paper, and to decrease waste.

SUMMARY

Old, corrugated boxes are often used as raw material in the manufacture of liner board and medium. Approximately 3-4 percent of it is not recyclable and presently taken to a landfill. The landfill cost is expensive and the preparation and hauling of waste is very time consuming and wasteful. The 3-4 percent waste is composed of plastic and fiber, with the fiber having been treated with a water preservative such as Kymene™ and the bond between the two having not been broken in the past.

In light of the above, disclosed embodiments may include a method of separating plastic from fiber. The method may include providing a solution including a chemical, such as magnesium hydroxide, and water. The method may include combining the solution with fiber, such as cardboard, paper, etc., to generate a fiber/chemical solution. The method may include agitating the fiber/chemical solution, such as in a blender for a period of time, to generate an agitated fiber/chemical solution. The method may include draining the agitated fiber/chemical solution through a sieve thereby separating one or more plastic particles from a remaining fiber/water mixture.

These and other features and attributes of the present disclosure and their advantageous applications and/or uses will be apparent from the detailed description which follows.

BRIEF DESCRIPTION OF THE DRAWINGS

To assist those of ordinary skill in the relevant art in making and using the subject matter hereof, reference is made to the appended drawings, wherein.

DETAILED DESCRIPTION

Corrugated boxes are often used as a raw material in the manufacture of certain products, such as liner board and medium. Approximately 3-4 percent has been treated with a water preservative and will not break down.

Examples of the present disclosure will provide for a method of separating plastic from fiber. For example, a method may include providing a solution including a chemical (e.g., magnesium hydroxide) and water, combining the solution with fiber to generate a fiber/chemical solution, agitating the fiber/chemical solution to generate an agitated fiber/chemical solution, and draining the fiber/chemical solution through a sieve thereby separating the plastic particles from a remaining fiber/water mixture.

For the purposes of this disclosure, the following definitions will apply:

As used herein, the terms "a" and "the" as used herein are understood to encompass the plural as well as the singular.

All numerical values within the detailed description that are modified by "about" or "approximately" with respect to the indicated value take into account experimental error and variations that would be expected by a person having ordinary skill in the art. In some instances, use of "about" or "approximately" may include a variation of #10% from the indicated value.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
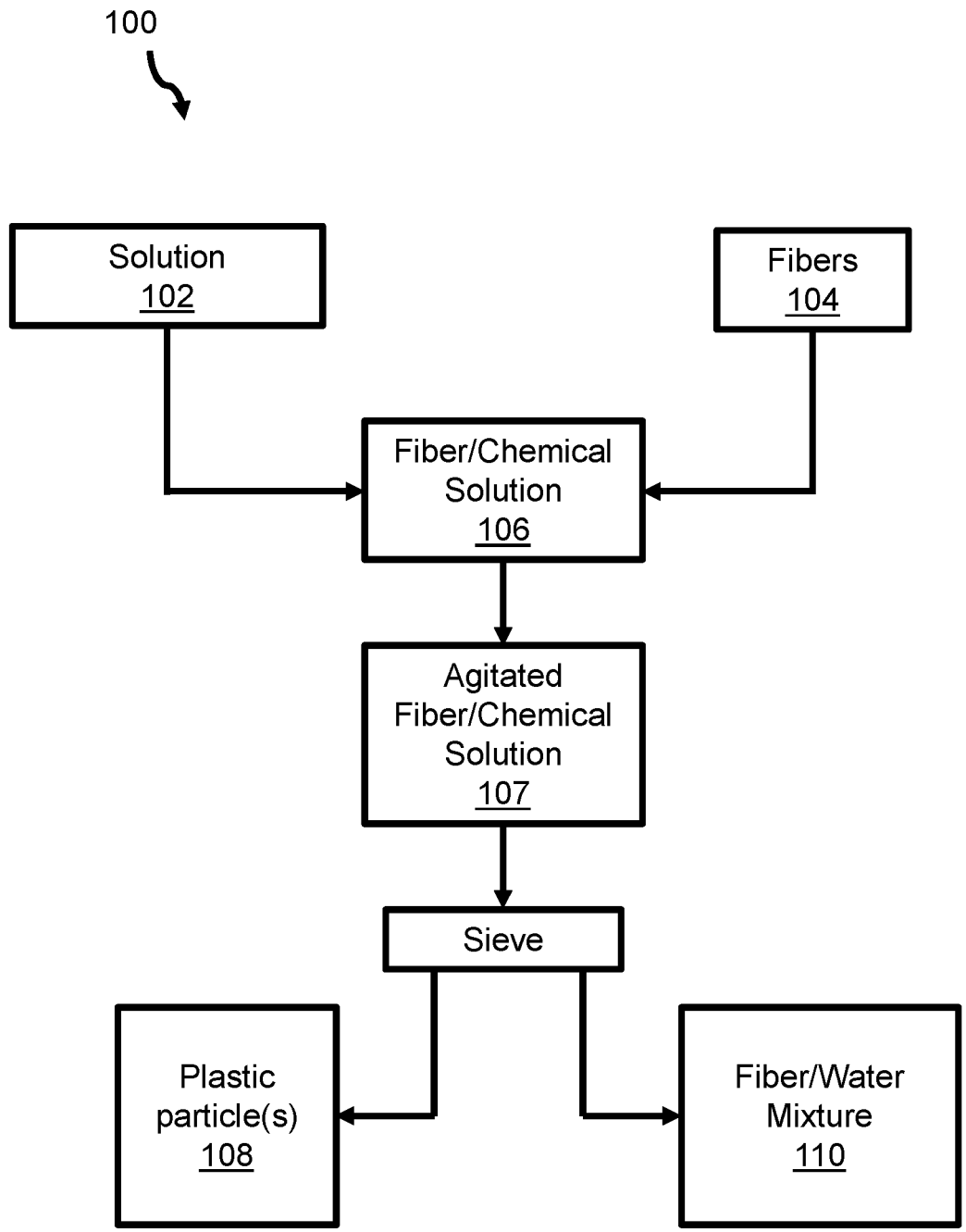
FIG. 1 is a block diagram of an example system used for separating plastic from fiber, in accordance with certain embodiments of the disclosed technology.

FIG. 1 is a block diagram of an example system used for separating plastic from fiber. As shown, a solution 102 and fibers 104 may be mixed together to form a fiber/chemical solution 106. In some embodiments, the solution 102 may include magnesium hydroxide and water (e.g., approximately greater than or equal to 1 weight % magnesium hydroxide, or approximately 3 weight % magnesium hydroxide and approximately 97 weight % water). In some embodiments, the solution 102 and/or the fiber/chemical solution 106 may be provided at approximately room temperature, e.g., between approximately 68° F. and 74° F.

The fiber/chemical solution 106 may be agitated for a certain amount of time, such as between approximately 2-5 seconds, to generate an agitated fiber/chemical solution 107.

The agitated fiber/chemical solution 107 may then be drained through a sieve such that one or more plastic particles 108 may be separated out of a remaining fiber/water mixture 110.

Figure 2:
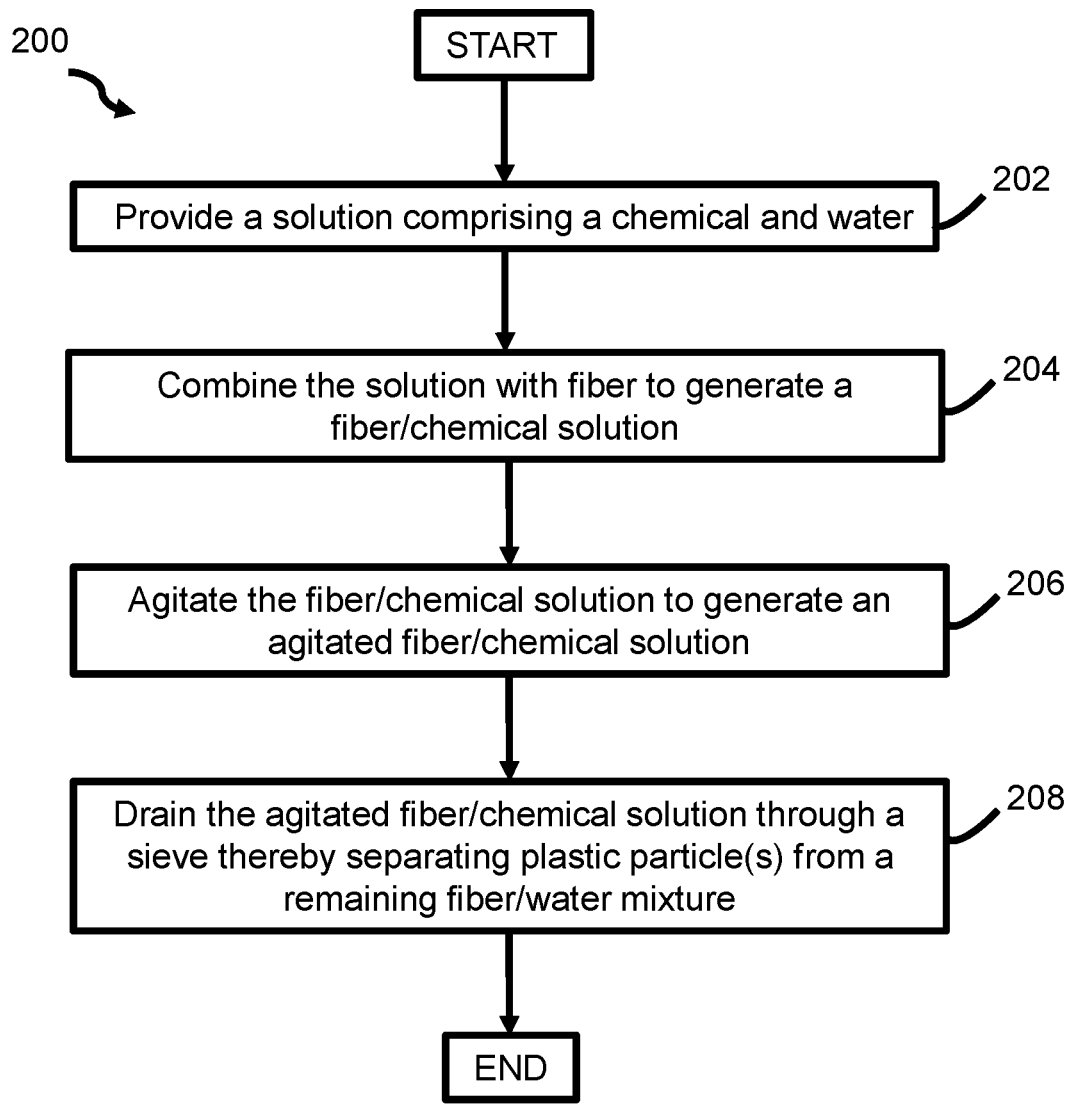
FIG. 2 is a flow diagram illustrating an exemplary method for separating plastic from fiber, in accordance with certain embodiments of the disclosed technology.

FIG. 2 is a flow diagram illustrating an exemplary method for separating plastic from fiber.

In block 202, the method may include providing a solution (e.g., solution 102) comprising a chemical (e.g., magnesium hydroxide) and water.

In block 204, the method may include combining the solution with fiber (e.g., fibers 104) to generate a fiber/ chemical solution (e.g., fiber/chemical solution 106). In some embodiments, the fiber may include cardboard (e.g., corrugated cardboard), paper, etc.

In block 206, the method may include agitating the fiber/chemical solution to generate an agitated fiber/chemical solution. The fiber/chemical solution may be agitated via, e.g., a blender, for a certain amount of time, such as between approximately 2 to 5 seconds, and/or at an agitation speed of between approximately 19,000 to 22,000 revolutions per minute (RPM).

In block 208, the method may include draining the fiber/chemical solution through a sieve thereby separating one or more plastic particles (e.g., plastic particle(s) 108) from a remaining fiber/water mixture (e.g., fiber/water mixture 110).

EXAMPLES

The following examples provide certain embodiments of the systems and methods disclosed herein as they were completed by a lab at Clemson University in 2022 (see Appendix A). This section is intended solely for explanatory purposes and not in limitation.

Materials

A 3-phase, 3 horsepower (hp) tabletop mixer (pulper) at 240 volts and 20 amps was used. A home-style kitchen blender was also used. Samples of magnesium hydroxide were used, as discussed further below.

Test Preparation

The mixer was placed in a ventilated area. A 4-inch drainage hose for the exit byproduct was attached to the mixer's side exit and situated over a 5-gallon bucket with a splash guard and a strainer (sieve) placed on top of the bucket to strain the plastic and heavier particulate from the fiber waste solution. A test was conducted to test the process of separating plastic from a fiber exit waste chemical solution. The test involved the fiber being placed directly through the top of the mixer door opening and into the bottom of the mixer so as to come in contact with the mixer blades.

Pretest

An initial pretest using 800 milliliters (mL) of pure water was used to verify that the mixer dispelled the exit waste solution and that the equipment functioned as intended. Both the fiber waste and water were combined in the mixer for 10 seconds. The mixer was then turned off. The fiber waste solution was drained into a sieve container by opening a side exit valve of the mixer. The equipment functioned as expected with dissolved fiber waste draining through the sieve, and undissolved fiber and plastic remaining on top of the sieve. A small percentage of leftover fiber waste remained in the mixer.

Test

An 800 mL solution of approximately 30 weight % magnesium hydroxide and approximately 70 weight % water was heated to 153° F. The heated magnesium hydroxide/water solution and fiber waste were then combined in the mixer for 10 seconds, followed by the mixer being turned off. The mixed fiber waste chemical solution was then drained through a side exit valve of the mixer and into a sieve container having ⅜-inch sieve openings. A small percentage of leftover fiber waste solution remained in the mixer, with most extracted through the exit valve into a sieve bucket. Some small plastic particles and slight undissolved fiber waste particulate remained separated (captured) in the sieve. The remaining fiber waste solution was then drained from the sieve bucket into another bucket to separate the top magnesium hydroxide/water solution from the heavier dissolved fiber waste particulate that had settled in the bottom of the sieve bucket. A small piece of metal was found to have passed through the sieve and into the fiber waste particulate; however, no plastic particulates were found in the fiber waste particulate.

Results

The test showed that magnesium hydroxide may be used along with water to break down and fully separate plastic from fiber.

CLAUSES

In some examples, disclosed systems or methods may involve one or more of the following clauses:

Clause 1: A method of separating plastic from fiber, the method comprising: providing a solution comprising a chemical and water; combining the solution with fiber to generate a fiber/chemical solution; agitating the fiber/chemical solution to generate an agitated fiber/chemical solution; and draining the agitated fiber/chemical solution through a sieve thereby separating one or more plastic particles from a remaining fiber/water mixture.

Clause 2: The method of clause 1, wherein the chemical comprises magnesium hydroxide.

Clause 3: The method of clause 2, wherein the solution comprises approximately 3 weight % magnesium hydroxide and approximately 97 weight % water.

Clause 4: The method of clause 2, wherein the solution comprises the magnesium hydroxide in an amount of greater than or equal to 1 weight %.

Clause 5: The method of clause 1, wherein the agitating of the fiber/chemical solution is conducted for about 2-5 seconds.

Clause 6: The method of clause 1, wherein the solution comprising the chemical and water is provided at a temperature of between approximately 68° F. and 74° F.

Clause 7: The method of clause 1, wherein the remaining fiber/water mixture comprises none of the one or more plastic particles.

Clause 8: The method of clause 1, wherein the sieve comprises one or more approximately ⅜ inch-openings.

Clause 9: The method of clause 1, wherein the fiber comprises cardboard, paper, or both.

Clause 10: A method of separating plastic from fiber, the method comprising: providing a solution comprising a chemical and water at a temperature; combining the solution with fiber to generate a fiber/chemical solution; agitating, for an amount of time, the fiber/chemical solution to generate an agitated fiber/chemical solution; and draining the fiber/chemical solution through a sieve thereby separating one or more plastic particles from a remaining fiber/water mixture.

Clause 11: The method of clause 10, wherein the chemical comprises magnesium hydroxide.

Clause 12: The method of clause 11, wherein the solution comprises an amount of the magnesium hydroxide of greater than or equal to approximately 1 weight %.

Clause 13: The method of clause 11, wherein the solution comprises an amount of the magnesium hydroxide of approximately 3 weight %.

Clause 14: The method of clause 10, wherein the temperature is between approximately 68° F. and 74° F.

Clause 15: The method of clause 10, wherein the remaining fiber/water mixture comprises approximately 0.0 of the one or more plastic particles.

Clause 16: The method of clause 10, wherein the amount of time is between approximately 2 to 5 seconds.

Clause 17: A method of separating plastic from fiber, the method comprising: providing a solution comprising magnesium hydroxide and water at a temperature; combining the solution with fiber to generate a fiber/chemical solution; agitating the fiber/chemical solution for a time period to generate an agitated fiber/chemical solution; and draining the agitated fiber/chemical solution through a sieve thereby separating one or more plastic particles from a remaining fiber/water mixture.

Clause 18: The method of clause 17, wherein the solution comprises approximately 3 weight % magnesium hydroxide and approximately 97 weight % water.

Clause 19: The method of clause 17, wherein the remaining fiber/water mixture comprises none of the one or more plastic particles.

Clause 20: The method of clause 17, wherein the sieve comprises one or more approximately ⅜ inch-openings.

Certain features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The foregoing description of the disclosure illustrates and describes the present methodologies. Additionally, the disclosure shows and describes exemplary methods, but it is to be understood that various other combinations, modifications, and environments may be employed, and the present methods are capable of changes or modifications within the scope of the concept as expressed herein, commensurate with the above teachings and/or the skill or knowledge of the relevant art.

What is claimed is:

1. A method of separating plastic from fiber for re-using the fiber in a paper manufacturing process, the method comprising:
   providing a paper product comprising a fiber web and a plastic embedded in the fiber web;
   providing a solution comprising a chemical and water;
   combining the solution with the paper product to generate a fiber/chemical solution;
   agitating the fiber/chemical solution to generate an agitated fiber/chemical solution; and
   draining the agitated fiber/chemical solution through a sieve thereby separating the embedded plastic from the fiber web.

2. The method of claim 1, wherein the chemical comprises magnesium hydroxide.

3. The method of claim 2, wherein the solution comprises approximately 3 weight % magnesium hydroxide and approximately 97 weight % water.

4. The method of claim 2, wherein the solution comprises the magnesium hydroxide in an amount of greater than or equal to 1 weight %.

5. The method of claim 1, wherein the agitating of the fiber/chemical solution is conducted for about 2-5 seconds.

6. The method of claim 1, wherein the solution comprising the chemical and water is provided at a temperature of between approximately 68° F. and 74° F.

7. The method of claim 1, wherein the sieve comprises one or more approximately ⅜ inch-openings.

8. The method of claim 1, wherein the fiber web comprises cardboard, paper, or both.

9. A method of separating plastic from fiber, the method comprising:
   providing a paper product comprising a fiber web and a polymer embedded in the fiber web;
   providing a solution comprising a chemical and water at a temperature;
   combining the solution with the fiber web to generate a fiber/chemical solution;
   agitating, for an amount of time, the fiber/chemical solution to generate an agitated fiber/chemical solution; and
   draining the fiber/chemical solution through a sieve thereby separating the polymer from a remaining fiber/water mixture comprising the fiber web.

10. The method of claim 9, wherein the chemical comprises magnesium hydroxide.

11. The method of claim 10, wherein the solution comprises an amount of the magnesium hydroxide of greater than or equal to approximately 1 weight %.

12. The method of claim 10, wherein the solution comprises an amount of the magnesium hydroxide of approximately 3 weight %.

13. The method of claim 9, wherein the temperature is between approximately 68° F. and 74° F.

14. The method of claim 9, wherein the remaining fiber/water mixture comprises none of the polymer.

15. A method of separating a plastic from a fiber web, the method comprising:
   providing a paper product comprising the fiber web and the plastic embedded in the fiber web;
   providing a solution comprising magnesium hydroxide and water at a temperature;
   combining the solution with the paper product to generate a fiber/chemical solution;
   agitating the fiber/chemical solution for a time period to generate an agitated fiber/chemical solution; and
   draining the agitated fiber/chemical solution through a sieve thereby separating the plastic from the fiber web.

16. The method of claim 15, wherein the sieve comprises one or more approximately ⅜ inch-openings.

17. The method of claim 1, wherein the paper product comprises corrugated cardboard.

18. The method of claim 1, wherein the plastic comprises a wet-strength additive.

19. The method of claim 18, wherein the wet-strength additive comprises Kymene™.

\* \* \* \* \*